US008111912B2

(12) United States Patent
Husseini et al.

(10) Patent No.: US 8,111,912 B2
(45) Date of Patent: Feb. 7, 2012

(54) COST-EFFECTIVE IMAGE METADATA CREATION USING NEAR-DUPLICATE IMAGE DETECTION

(75) Inventors: Ibrahim Husseini, London (GB); Neela Sawant, Maharashtra (IN); Srinivasan Sengamedu, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 1028 days.

(21) Appl. No.: 12/032,521

(22) Filed: Feb. 15, 2008

(65) Prior Publication Data

US 2009/0208097 A1   Aug. 20, 2009

(51) Int. Cl.
G06K 9/00 (2006.01)
G06K 7/00 (2006.01)
(52) U.S. Cl. .......... 382/162; 382/168; 707/713
(58) Field of Classification Search .......... 382/162, 382/165, 168, 209, 218, 305, 312; 715/719; 725/34; 345/589, 597; 707/713
See application file for complete search history.

(56) References Cited

U.S. PATENT DOCUMENTS

| 6,246,790 | B1 | 6/2001 | Huang et al. |
| 6,297,853 | B1 * | 10/2001 | Sharir et al. ............... 348/589 |
| 6,430,312 | B1 * | 8/2002 | Huang et al. ............... 382/165 |
| 6,658,423 | B1 | 12/2003 | Pugh et al. |
| 6,957,387 | B2 * | 10/2005 | Barbieri ............... 715/719 |
| 6,993,180 | B2 | 1/2006 | Sun et al. |
| 7,379,627 | B2 * | 5/2008 | Li et al. ............... 382/305 |
| 7,542,610 | B2 * | 6/2009 | Gokturk et al. ............... 382/209 |
| 7,552,458 | B1 * | 6/2009 | Finseth et al. ............... 725/34 |

OTHER PUBLICATIONS

"Document Technologies Offers Near-Duplicate Detection Using Equivio Technology", Jan. 9, 2007, http://www.equivio.com/PR070109.shtml.
"US Patent 6,658,423, William Pugh", http://www.cs.umd.edu/~pugh/google/Duplicates.pdf.
"Identifying and Filtering Near-Duplicate Documents", Adrei Z. Broder, AltaVista Company, San Mateo, CA, Springer-Verlag Berlin Heidelberg 2000.

* cited by examiner

*Primary Examiner* — Kanjibhai Patel
(74) *Attorney, Agent, or Firm* — Berkeley Law & Technology Group, LLP

(57) ABSTRACT

Briefly, embodiments describe a method, article and/or system for determining image similarity.

22 Claims, 6 Drawing Sheets

COST-EFFECTIVE IMAGE METADATA CREATION USING NEAR-DUPLICATE IMAGE DETECTION

FIELD

This disclosure relates to a method, article and/or system for determining image similarity.

BACKGROUND

Images may be manually reviewed by a human to determine whether the images are duplicates, substantially similar, variations of one another, or different. This manual review process may be time and resource consuming. Two images may have different layouts or formats but may contain similar or substantially the same content. In this sense, the images may be members of an image family or grouping, but due to their layout differences, not be identical. For example, images having similar content may be positioned in different formats, such as landscape or portrait. Images having similar content may be formatted for on-line display at different portions of a webpage or website, such as for banner advertisement at the top of a page, display along a side or side bar of a webpage, display at the bottom of a webpage, or display as click-on buttons of varying shapes and sizes. In this sense, though the image content is substantially the same, the images are not identical due to formatting differences.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference to the following detailed description if read with the accompanying drawings in which:

DETAILED DESCRIPTION

Figure 1:
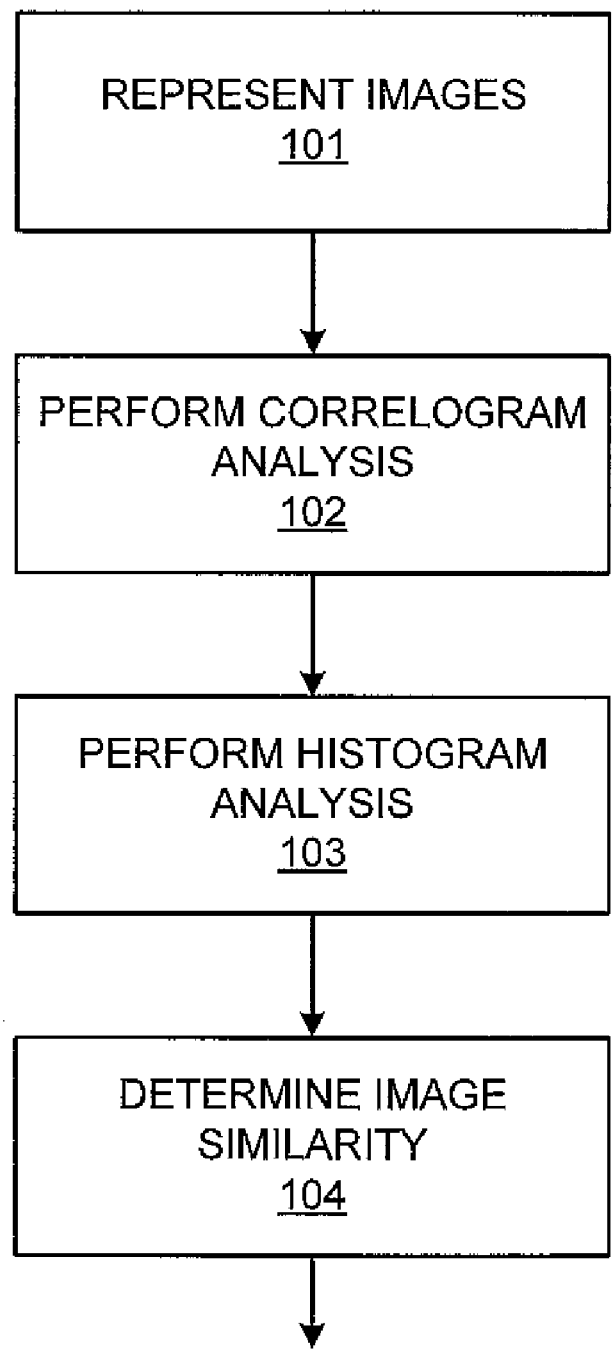
FIG. 1 is a flow chart showing one embodiment of correlogram and histogram analysis.

In the following detailed description, numerous specific details are set forth in order to provide a thorough understanding of claimed subject matter. However, it will be understood by those skilled in the art that claimed subject matter may be practiced without these specific details. In other instances, well-known methods, procedures, or components have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", computing "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In various embodiments, images may be determined to be similar based upon correlogram analysis and histogram analysis. The correlogram and histogram analysis may be performed separately and/or independently and then compared in different embodiments. In one or more embodiments, near-duplicate detection algorithms may be employed to detect similar, identical and/or dissimilar images.

Although examples or embodiments described herein refer to images that are advertisements used in a computerized or online setting, such examples are meant for illustrative purposes rather than to limit the scope of claimed subject matter. Claimed subject matter is not limited to advertisements. Similarly, claimed subject matter is not limited to images that are similar or near-duplicates. Claimed subject matter is also not limited to images tagged with metadata. Rather, claimed subject matter may be used with any image. Such images may include, without limitation, pictures, photographs, drawings, renderings, charts, displays, or various combinations thereof.

Additionally, though electronic images are sometimes used for purposes of illustration, claimed subject matter is not intended to be limited to computer based images. Images discussed in this application may include images created or displayed via different electronic media, such as: computer; PDA; GPS; personal communication device; cellular telephone; personal video or DVD player; personal music player with image capabilities; camera; games; toys; and many combinations and variations thereof. Display applications for images may include software, firmware, hardware and/or operating system applications, on-line or Internet sites and/or webpages, or various combinations thereof. These are merely a few examples of the many possible examples within the scope of claimed subject matter and, therefore, the previous examples are not intended to provide an exhaustive list.

Claimed subject matter may be used with or in many applications. For example, advertisement categorization for targeted advertising may employ a method for determining image similarity. Again, many other examples exist within the scope of claimed subject matter and the previous examples are not intended to be so limiting nor provide an exhaustive list of examples.

In various embodiments, the images may be in the form of advertisements. In one embodiment, advertisements may be assigned metadata. However, other types of images may also be tagged with metadata. And images having metadata are only one type of image used in various embodiments. Claimed subject matter is not limited to use with images having metadata.

In an embodiment, multiple advertisements may have similar or substantially the same image content, but wherein the advertisements have different layouts. For example, an advertisement may be directed to the same product(s) and/or service(s), but may be designed for display at different portions of a webpage, such as but not limited to a banner advertisement located at the top of a webpage, a display along the side of a webpage, or display at the bottom of a webpage, just to name a few examples. Though content may be near identical, because the format differs between such images, the images are not identical. Images that contain substantially the same content displayed in different formats may be a family of images. It is useful to be able to identify a family of images without having to have a human hand review all images. However, the scope of claimed subject matter is not limited to use with near identical images. This is merely one of many types of images that may be used with various embodiments. These are merely provided as illustrative examples without loss of generality.

In order to determine whether images, such as advertisements, are similar, manual creation of metadata is known. Often image designers, including but not limited to those in advertising, promote several variations of an image to accommodate different page formats, positions and the like, such as those discussed above. Since image variations may have the same or similar content, metadata of image variations is in many cases the same. Metadata may be used to facilitate understanding, use and management of data. Examples of image metadata may include, for example, Exchangeable Image File Format (EXIF) and Tagged Image File Format (TIFF). Often image metadata are attained through tags. This is merely a brief description of metadata. There are many more examples known to those skilled in the relevant art and claimed subject matter is not so limited.

Applications such as behavioral targeting (targeted advertising based on users' online behavioral patterns) may use metadata for image-based display ad classification, but manual creation of metadata is time and resource consuming. Automatically detecting image variations (and/or conversely image similarity) would reduce metadata creation effort. Automatically comparing images for similarity, such that an image family or grouping could be identified, would allow the metadata for the image family to be created manually only once, and then applied to the other images within the family. Creating metadata one time for an image family, instead of individually for each and every image within the family, would save on time and resources.

As discussed in U.S. Pat. No. 6,246,790 ("the '790 patent"), color correlograms and banded color correlograms may be used to describe images. A color correlogram may represent a probability of finding a pixel of a selected color at a selected distance from a second pixel of the selected color within an image. Such a correlogram may express how the correlation of color changes with distance within an image. In this sense, a color correlogram may encode spatial co-occurrence of image colors i and j as the probability of finding i and j within an area of radius d at a distance k in the image. This may be expressed as a three dimensional vector (i,j,k). Color correlograms may employ pixel information including pixel color and distance information for distances between pixels within an image. For example, image colors may be quantized into 64 values in HSV color-space, but other color spaces such as but not limited to RGB, HSI, or CIELAB may also be used. Distance values may be determined for distances between pixels in an image, and a maximum distance may be determined for pixels within an image.

Another technique for grouping images with similarities based upon color correlogram analysis is described in U.S. Pat. No. 6,993,180 ("the '180 patent"). In the '180 patent, color correlograms are calculated for each image. Then images are grouped into sets or clusters based upon relative similarities in their correlograms and based upon a hierarchical structure of the correlograms. This technique may represent each set of similar correlograms by a level 1 representative, which may be an average of correlograms from that set. The set of level 1 correlogram representatives are further combined in a similar fashion to create level 2 representatives and so on. Thus, the image grouping described in the '180 patent is hierarchical in nature.

Banded correlograms may comprise a form of a color correlogram. These may be described as a restricted version of a correlogram in which, for a color pair of pixels, the probability values for the distances in the selected distance set are summed and entered into the banded correlogram as a single number. A banded color correlogram may encode spatial co-occurrence of image colors and j as the probability of finding i and j within an area of radius d in the image. This may be expressed as a two dimensional vector (i,j) after d is fixed.

One example method of calculating a color correlogram is to take a pixel, P1, having a first color (C1) and count all pixels having color C2 that are located at a first selected distance (D1) from pixel P1. Pixels having color C2 may be counted at each selected distance, within the set of counted distances, from pixel P1. This may be repeated for each pixel (P2 . . . Pmax) over all of the selected distances (D1 . . . Dmax) from the set of distances within the image. Algorithms, such as but not limited to those described in the '790 patent, may accomplish this.

Although color correlograms may be accurate for large changes in appearance of an image and may be relatively small from a data storage perspective, correlogram analysis is often not accurate for small changes in appearance of an image, such as but not limited to, small changes in color. For example, in the presence of a single dominant color in an image, correlogram matching often suffers from false positives. This means that correlogram analysis may identify images as similar or nearly identical that actually are different.

For example, correlogram analysis may suffer from a greater false detection rate due to the correlogram normalization technique used, which we attempt to reduce using a histogram verification technique.

A hierarchical correlogram analysis may also result in a higher rate of misidentification. This is mainly due to the hierarchical nature and that there is no mechanism for verifying that images identified as being similar are not false positives.

In an embodiment, images may be represented. Correlograms may be built for the images. A query image may be selected and any similarity or distance measure, such as but not limited to the Euclidean Distances, between the query image correlogram and the correlograms for one or more other images may be calculated. One or more images having the smallest distance may be selected (1NN). Histograms may be built for the query and 1NN images. The similarity or distance measure between the histograms may be calculated and if the distance is within a threshold, the images may be determined to be similar or near-duplicates. Similar or near-duplicate images may be merged into groups. However, claimed subject matter is not limited to this example and there are other embodiments and applications of the disclosed subject matter.

In another embodiment, images may be represented. Histograms may be built for the images. A query image may be selected. A similarity or distance measure, such as but not limited to Euclidean Distance, between the histogram of the query image and the other images may be calculated and distances meeting threshold criteria may be selected. Correlograms for the query image and selected images may be built. A similarity or distance measure between the correlogram for the query image and the selected images may be calculated. Distances meeting threshold criteria may be determined to be similar or near-duplicate. Similar or near-duplicate images may be merged into groups. However, claimed subject matter is not limited to this example and there are other embodiments and applications of the disclosed subject matter.

In one particular embodiment, images with common metadata may be merged into a grouping or family, based upon the common metadata. Beginning with a collection of images for which metadata may be created, image features may be calculated for each image. Images for which the features are very similar may be considered near duplicates. Here, images may be sorted into groups containing near duplicates. For each group, one representative may be chosen. A human reviewer may then assign appropriate metadata to that representative image and the same metadata may be used for all images within that group. Using this method, the need to create metadata individually for each and every image may be eliminated. However, claimed subject matter is not limited to this example and there are other embodiments and applications of the disclosed subject matter.

Again, claimed subject matter is not limited in scope to a particular embodiment. Therefore, the embodiments described previously or hereinafter are intended simply as examples for purposes of illustration. Many other approaches and/or embodiments are intended to be included within the scope of claimed subject matter other than these specific examples. Nonetheless, continuing with these examples, reference is now made to FIG. 1. FIG. 1 depicts an embodiment of a method for determining image similarity. In accordance with this embodiment, at block 101, images are represented. In different embodiments, images may be represented by pixel information and distance information for distances between pixels. Pixel information may include color information, which may be obtained by quantizing the image into 64 values in HSV color-space, though this is not required. In some embodiments, feature vectors may be calculated or obtained for images.

At block 102, correlogram analysis is performed. In some embodiments, correlograms may be built for one or more images. In other embodiments, correlograms may be built for some or all images. Correlograms may be built by different techniques, including but not limited to, selecting a pixel of a first color and counting other pixels of a second color at each distance from the selected pixel. The second color may take the same value as the first color or be different. This process may be repeated for other pixel(s) within the image. In some embodiments, this process may be repeated for all pixels within an image. Banded correlograms may be employed. The correlograms may be compared to determine image similarity. In some embodiments, correlograms may be compared by determining Euclidean Distances between two or more correlograms.

At block 103, histogram analysis is performed. In different embodiments, histogram analysis may be performed before, during or after correlogram analysis. In different embodiments, histograms may be built for one or more images. In some embodiments histograms may be built for some or all images. In one particular example, histograms may capture proportionality of colors in an image, thereby reducing false positives introduced by correlogram analysis. The histograms may be compared to determine image similarity. One histogram is built per image. In some embodiments, the histograms may be compared by determining the Euclidean Distances between histograms for two or more images.

At block 104, image similarity is determined based, at least in part, upon the correlogram and histogram analysis. In different embodiments, image similarity may be determined by employing a threshold, such that images within the threshold criteria are determined to be similar. In some embodiments, image similarity may be determined if a Euclidean distance between correlograms and/or histograms is within the threshold criteria.

Figure 2:
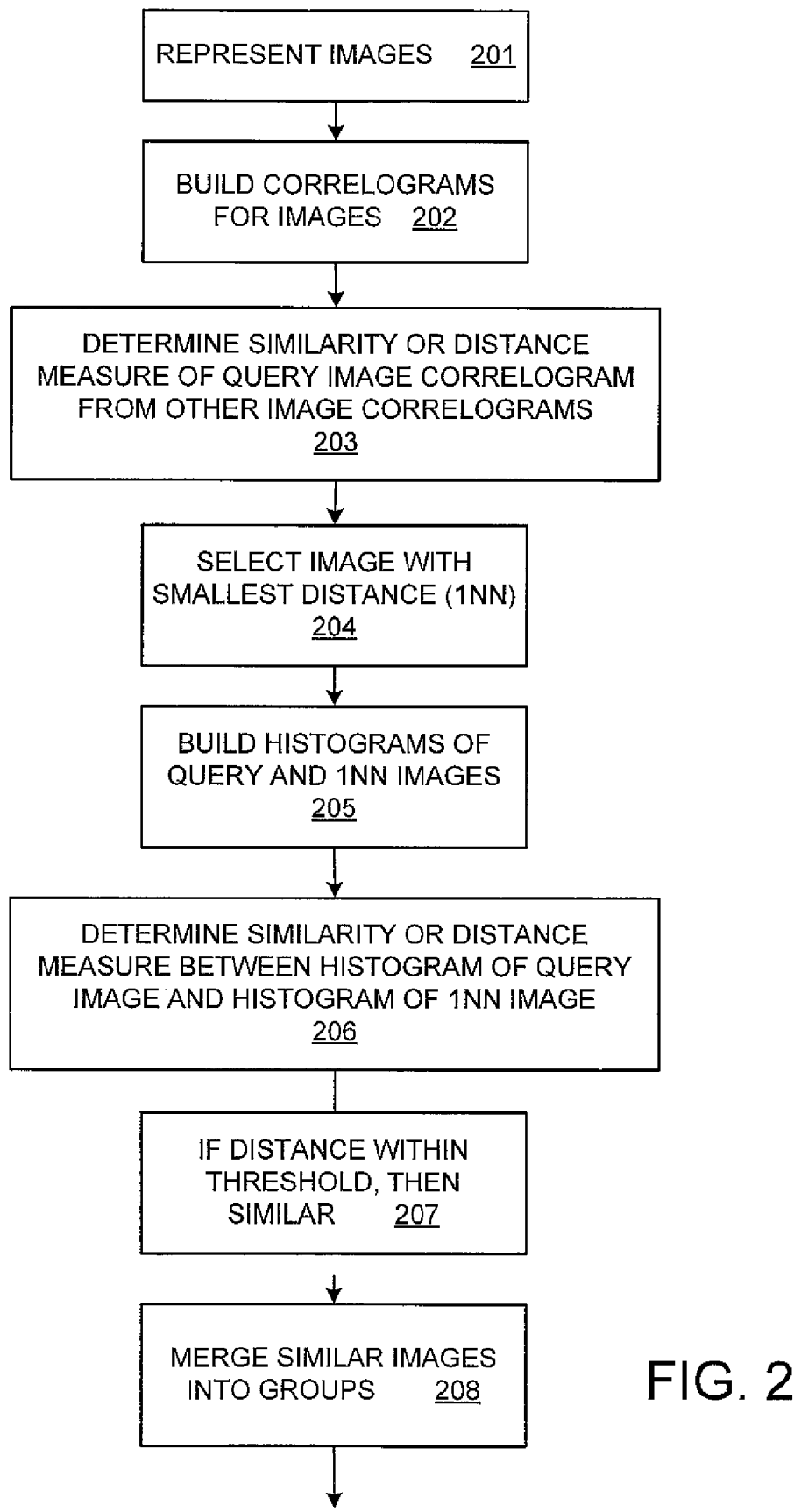
FIG. 2 is a flow chart showing an embodiment of correlogram analysis with histogram verification.

FIG. 2 depicts an alternate embodiment of a method for detecting image similarity. At block 201, two or more images are represented. In various embodiments, images may be represented by characteristics such as pixel color and distance between pixels. Further, images may be represented by quantizing the pixel color and determining distance between pixels and/or a maximum distance between pixels in an image, in one or more embodiments. Colors in an image may be quantized into discrete colors C1 to Cmax. For example, colors in an image may be quantized into 64 colors, C1 to C64. In different examples images may be represented by relative pixel color. In this particular example, the pixels are also represented by pixel location. In other embodiments, pixels may be represented by relative pixel location. In various embodiments, the images may be represented by other data and/or characteristics. Other types of image representation are known in the art and claimed subject matter is not intended to be limited to a particular type of image representation.

At block 202, correlograms may be formed for the images. In this embodiment, correlograms may be built by selecting a pixel and identifying its color (Ci). A distance may be selected. Pixels located at the selected distance, as measured from the selected pixel, having the same color Ci as the query pixel and having a color Cj contribute to correlogram bin corresponding to pair (Ci, Cj) where Ci and Cj can be any color between C1 to Cmax (i.e Ci is not necessarily equal to Cj) may be counted. This process may be carried out for all image pixels for each selected distance. In this manner, some or all pixels within an image may be analyzed. In this manner, in this embodiment, a color correlogram may be built for an image. This may be repeated for some or all images represented. This embodiment is merely one example of building a correlogram and claimed subject matter is not intended to be limited to this particular type of correlogram building.

According to one or more embodiments, a color correlogram may be built that represents the spatial correlation of color within an image in a data object which may be associated with an image and subsequently stored in a database and queried to analyze the image. Colors may be quantized into colors C1 to Cmax and distances between pixels, such as the distance between pixels p1 and p2, where p1=(x1,y1) and p2=(x2,y2), may be represented by:

$$|p1-p2|=\max\{|x1-x2|,|y1-y2|\}$$

Correlogram identification of the image may include calculating distances k for all of the quantized color pairs $(C_i, C_j)$. The image correlogram, $I_c$, may be represented as a matrix. The following quantities are defined, which count the number of pixels of a given color C within a given distance k from a fixed pixel (x,y) in the positive horizontal (represented by h) and vertical (represented by v) directions:

$$\lambda^{c,h}(x,y)(k) = |\{(x+i,y) \in I_c, 0 \leq i \leq k\}|$$

$$\lambda^{c,v}(x,y)(k) = |\{(x,y+j) \in I_c, 0 \leq j \leq k\}|$$

These particular expressions represent a restricted count of the number of pixels, to horizontal and vertical directions, in lieu of a radius approach. A radius approach may also be employed in some embodiments.

For this embodiment, the $\lambda^{c,h}_{(x,y)(k)}$ and $\lambda^{c,v}_{(x,y)(k)}$ values may be calculated using dynamic programming (as described in the '790 patent.) The correlogram is then computed by first computing the "co-occurrence matrix" as:

$$\Gamma^{(k)}_{ci,cj}(I) = \sum_{(x,y) \in Ici} \left( \lambda^{c,h}_{j\,(x-k,y+k)}(2k) + \lambda^{c,h}_{j\,(x-k,y-k)}(2k) + \lambda^{c,v}_{j\,(x-k,y-k+1)}(2k-2) + \lambda^{c,v}_{j\,(x+k,y-k+1)}(2k-2) \right)$$

And then normalizing the same using histogram h of I as:

$$\gamma^{(k)}ci,cj(I) = \Gamma^{(k)}ci,cj(I)/(hci*8k)$$

where $h_{ci}$ represents histogram bin corresponding to color Ci under consideration. Again, this is merely one method of building a correlogram and claimed subject matter is not intended to be limited to this example.

In some embodiments, banded correlograms may be built. Whereas correlograms may be represented by a three dimensional vector (i,j,k), for banded color correlograms, distance (k) may be fixed such that the correlogram may be represented by a two dimensional vector (i,j) where the value at position i and j is the probability of finding color i and j together within a fixed radius of k pixels. The two dimensional vector may comprise a series of summed probability values.

Continuing with this particular embodiment, at block 203, correlograms of the images may be analyzed. In this embodiment, a query image is selected. Any image represented may be a query image. A similarity or distance measure, such as but not limited to Euclidean Distances, of a correlogram of the query image from other correlograms of the one or more other images being analyzed and/or compared are determined. Such similarity or distance measures may be calculated for one, some or all correlograms. In various embodiments, more than one query image may be selected and corresponding similarity or distance measures between the correlograms of the query images and other image(s) may be determined. Employing a Euclidean Distance to compare images is but one example of analyzing and/or comparing images and claimed subject matter is not intended to be limited to this embodiment.

In this embodiment, at block 204, an approximate nearest neighbor, or image having the smallest similarity or distance measure, such as but not limited to Euclidean Distance, (1NN) may be selected. In various embodiments, other images having other similarity or distance measures may be selected in addition to or instead of the image having the smallest Euclidean Distance, though this is not required. Selecting the image having a smallest similarity or distance measure and/or using a Euclidean Distance analysis are merely examples of manners of performing correlogram analysis and other types of correlogram analysis may be performed in addition to instead of the particular embodiments described herein. Claimed subject matter is not intended to be limited to this particular example of correlogram analysis.

According to this embodiment, at block 205, histograms may be built for the query image and the 1NN image being compared. In various embodiments, histograms may be built for other images being compared in addition to or instead of the query and 1NN images, though this is optional. The histograms may be built by counting a fraction of image pixels belonging to each of the colors C1 to Cmax. The histograms may be built independently of the correlograms, and in this sense may serve as an independent check for image similarity, as opposed to prior known teachings wherein any histogram-like analysis has been used to normalize the correlogram analysis and not to refine it or serve as a second analysis.

At block 206, histogram analysis may be performed. For example, histogram analysis may be histogram verification. In this embodiment, histogram verification may be accomplished by determining a similarity or distance measure, such as but not limited to Euclidean Distance, between the histogram of the query image and the histogram of the 1NN image. One or more other similarity or distance measures between histograms of other image(s) and the query image may be determined instead of or in addition to the histogram of the 1NN image, but this is optional. Again, this is but one example of histogram analysis and claimed subject matter is not intended to be limited to this particular embodiment.

Block 207 indicates that if the determined similarity or distance measure, such as but not limited to Euclidean Distance, between the query image and the 1NN image is within a threshold, then the images may be determined to be similar. The threshold may be preset in various embodiments. The threshold may be adjustable and/or varied in different embodiments. For example, the threshold may be set so that only identical images are determined to be similar. The threshold may be set so that substantially similar images are determined to be identical in other embodiments. The threshold may be configurable or adjustable according to the desire for precision in an application. For example, a small threshold may be set yielding precise results, but all similar images may not be identified. Conversely, a high threshold may be set to yield detection of more duplicates, but may have a higher false detection rate. In other words, the threshold may be adjusted so that images which are similar are not identified as similar, or such that images that are not similar are erroneously identified as being similar. In other examples, the threshold may be varied so that images which are not similar are identified as not being similar. For different applications, different thresholds may be selected of varying sensitivities, depending upon application goals and operations.

In various embodiments, the threshold may be set in different ways. For example, the threshold may be set so that if the similarity or distance measure between the query image histogram and the 1NN image histogram is less than the threshold, the images are identified as being similar. The threshold may be set so that if the similarity or distance measure meets the threshold, the images are identified as being similar or the same. The threshold may be set so that if the similarity or distance measure exceeds the threshold, the images are identified as being similar. Various combinations of the example thresholds may be used and claimed subject matter is not limited to a particular type or manner of setting a threshold.

Block 208 indicates that in this embodiment, similar images may be merged into groups or families. The similar images being grouped may be near-duplicates for some applications, and/or the similar images being grouped may be identical for other applications. The similar images being grouped may be images having the same metadata, or images within a grouping may be assigned the same metadata in other applications. In this manner, a human reviewer would only need to create metadata once for each grouping and the other group members would be assigned the same metadata for that group. In various embodiments, similar images may not be grouped at all. However, in other embodiments, grouping similar images may result in efficiencies for applications such as image categorization. Again, grouping images is not required and claimed subject matter is not intended to be limited by image grouping, nor to any particular type of image grouping described in various embodiments.

Figure 3:
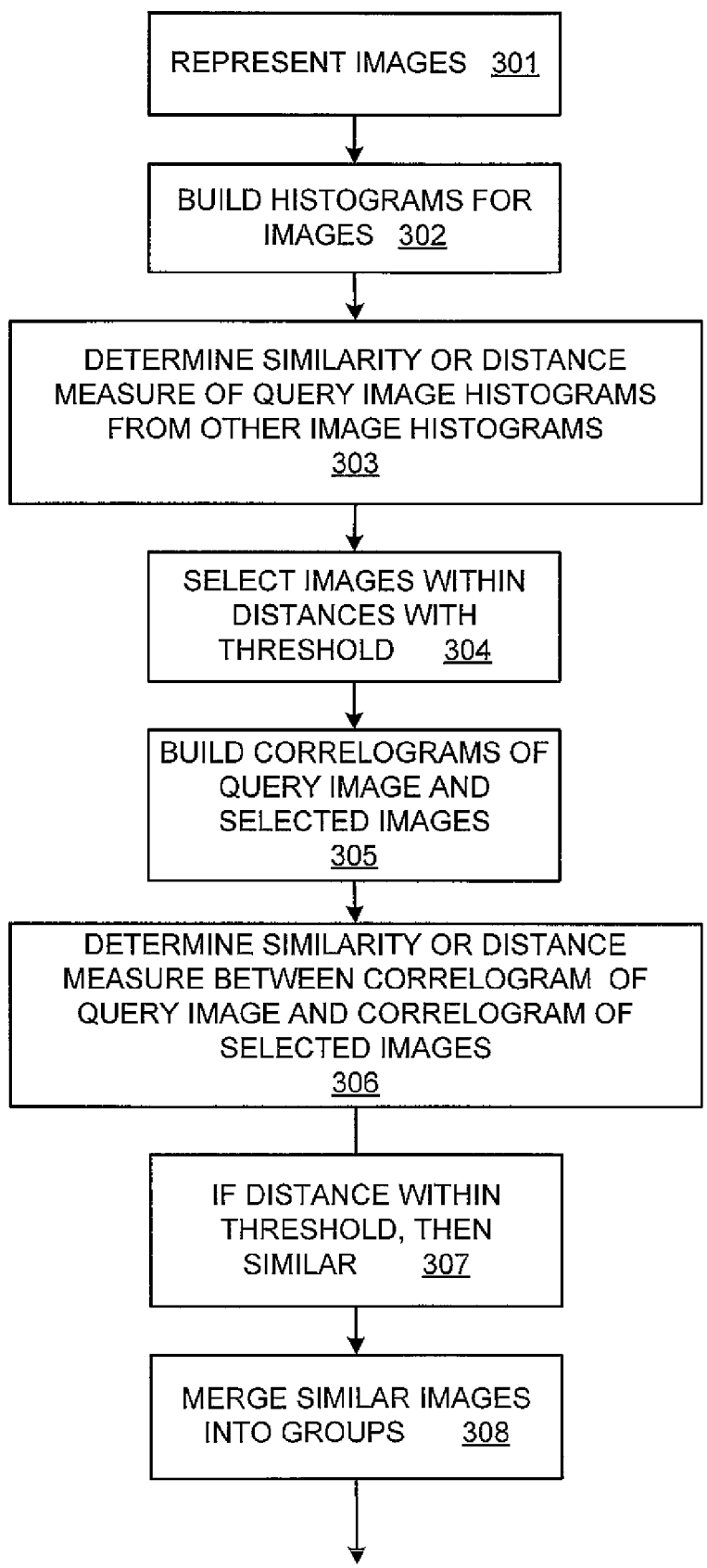
FIG. 3 is a flow chart showing an embodiment of histogram analysis with correlogram verification.

FIG. 3 describes another embodiment for determining image similarity. At block 301, two or more images may be represented. As described above, images may be represented by various data and/or characteristics, such as but not limited to, pixel color and relative distance. Claimed subject matter is not intended to be limited to a particular embodiment of image representation.

At block 302, histograms may be built for the images represented. Histograms may be built for two or more images being compared. In embodiments, histograms may be built for some or all images represented. Histograms may be built by various techniques, such as those described above. Again, claimed subject matter is not limited to one type of histogram nor a particular method of building a histogram, as various methods are known in the art and this is but one example.

Histogram analysis may be performed at block 303. In this embodiment, a query image may be selected. The query image may be any image represented. In this example, a similarity or distance measure, such as but not limited to the Euclidean Distance, between the histogram of the query image and the histograms of other images are determined. Similarity or distance measures may be determined for some or all histograms, as compared to the query image histogram, in different embodiments.

Images within a threshold may be selected at block 304. The threshold may be preset, adjustable and/or varied, as described above. The threshold may be set to identify similar images, as described in this embodiment, and/or to identify identical and/or dissimilar images in other embodiments. One or more images meeting threshold criteria may be selected.

At block 305, correlograms are built for one or more selected images and the query image. In other embodiments, correlograms may be built for one or more other images that are not selected at block 304. In some embodiments, correlograms may be built for all images represented. Color correlograms may be built by various techniques known in the art, such as but not limited to those described above.

Correlogram analysis may be performed at block 306. In this embodiment, correlogram analysis may be correlogram verification. Similarity or distance measures, such as but not limited to the Euclidean Distances, between the correlogram of the query image and the correlograms of the selected images may be determined. Similarity or distance measures, such as but not limited to Euclidean Distances, between the correlogram of the query image and other images may also be determined in different embodiments. In various embodiments, more than one query image may be selected and corresponding similarity or distance measures between the correlograms of the query images and other image(s) may be determined. Again, determining Euclidean Distances is but one example of correlogram verification and correlogram analysis and claimed subject matter is not limited to this particular embodiment.

Block 307 depicts that if a similarity or distance measure is within a threshold, then the images may be determined to be similar. As described above, the threshold may be preset, adjustable and/or varied in different embodiments. Thresholds may identify similar images, identical images, and/or dissimilar images in various applications. One example threshold may be a threshold wherein the nearest neighbor, or image having the smallest similarity or distance measure, such as but not limited to Euclidean Distance, (1NN), is selected as a similar image. This may be repeated for one or more next nearest neighbors until a threshold is met. Different applications may utilize different combinations of thresholds. For example, in various embodiments, other images having other similarity or distance measures may be identified as similar in addition to or instead of the image having the smallest Euclidean Distance. This is merely one example of a threshold and claimed subject matter is not intended to be limited to this embodiment.

As described above, similar images may be merged into groups or families at block 308. The similar images being grouped may be near-duplicates, identical, images having the same metadata, images to be assigned the same metadata, and/or dissimilar images. In various embodiments, similar images may not be grouped at all. However, in other embodiments, grouping similar images may result in efficiencies for applications such as image categorization. Again, grouping images is not required and claimed subject matter is not intended to be limited by image grouping, nor to any particular type of image grouping described in various embodiments.

In some embodiments, correlogram and/or histogram analysis may include first determining identical or duplicate images. Identical and/or duplicate images may be merged into groups. After this initial group formation, analysis to identify near duplicates and/or similar images for each group is completed, as described above. In some embodiments, images having no duplicates may be tossed out and analysis to identify near duplicates for these images may not be performed.

Figure 4:
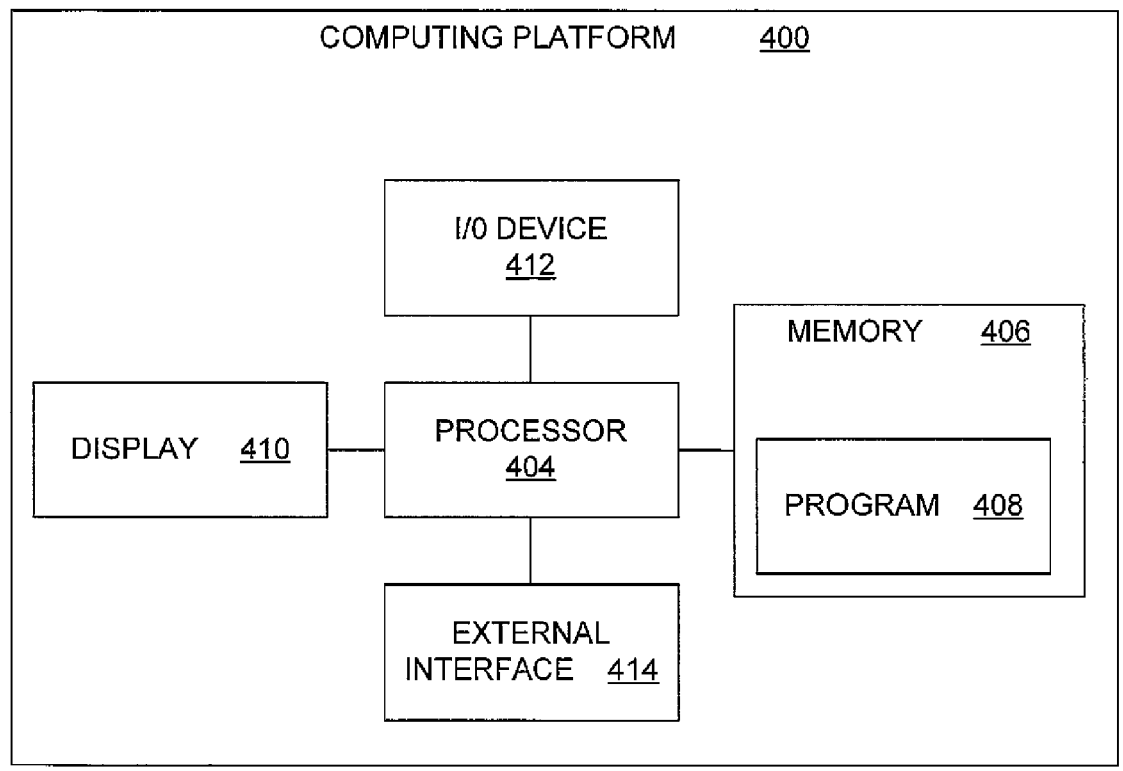
FIG. 4 is a block diagram of a computing platform.

Referring to FIG. 4, a block diagram of an example computing platform 400 according to one or more embodiments is illustrated, although the scope of claimed subject matter is not limited in this respect. The methods described in FIGS. 1-3 may be performed by and/or with computing platform 400; though again, claimed subject matter is not limited to these particular embodiments. Computing platform 400 may include more and/or fewer components than those shown in FIG. 4. However, generally conventional components may not be shown, for example, a battery, a bus, and so on.

Computing platform 400, as shown in FIG. 4 may be utilized to tangibly embody a computer program and/or graphical user interface by providing hardware components on which the computer program and/or graphical user interface may be executed. Computing platform 400 may be utilized to tangibly embody all or a portion of FIGS. 1-3 and/or other procedures disclosed herein. Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 4, computing platform 400 may be controlled by processor 404, including one or more auxiliary processors (not shown). Processor 404 may comprise a central processing unit such as a microprocessor or microcontroller for executing programs, performing data manipulations, and controlling the tasks of computing platform 400. Auxiliary processors may manage input/output, perform floating point mathematical operations, manage digital signals, perform fast execution of signal processing algorithms, operate as a back-end processor and/or a slave-type processor subordinate to processor 404, operate as an additional microprocessor and/or controller for dual and/or multiple processor systems, and/or operate as a coprocessor and/or additional processor. Such auxiliary processors may be discrete processors and/or may be arranged in the same package as processor 404, for example, in a multicore and/or multithreaded processor; however, the scope of the scope of claimed subject matter is not limited in these respects.

Communication with processor 404 may be implemented via a bus (not shown) for transferring information among the components of computing platform 400. A bus may include a data channel for facilitating information transfer between storage and other peripheral components of computing platform 400. A bus further may provide a set of signals utilized for communication with processor 404, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the institute of Electrical and Electronics Engineers (IEEE) including IEEE 488 general-purpose interface bus (GPIB), IEEE 696/S-100, and so on, although the scope of the scope of claimed subject matter is not limited in this respect.

Other components of computing platform 400 may include, for example, memory 406, including one or more auxiliary memories (not shown). Memory 406 may provide storage of instructions and data for one or more programs 408 to be executed by processor 404, such as all or a portion of FIGS. 1-3 and/or other procedures disclosed herein, for example. Memory 406 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 406 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 806 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 400 further may include a display 410. Display 410 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 410 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 400 further may include one or more I/O devices 412. I/O device 412 may comprise one or more I/O devices 412 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 400 further may include an external interface 414. External interface 414 may comprise one or more controllers and/or adapters to prove interface functions between multiple I/O devices 412. For example, external interface 414 may comprise a serial port, parallel port, universal serial bus (USB) port, and IEEE 1394 serial bus port, infrared port, network adapter, printer adapter, radiofrequency (RF) communications adapter, universal asynchronous receiver-transmitter (UART) port, and/or the like, to interface between corresponding I/O devices 412.

Figure 5A:
FIGS. 5a-5c are examples of images which may be analyzed in accordance with one or more embodiments.
Figure 5B:
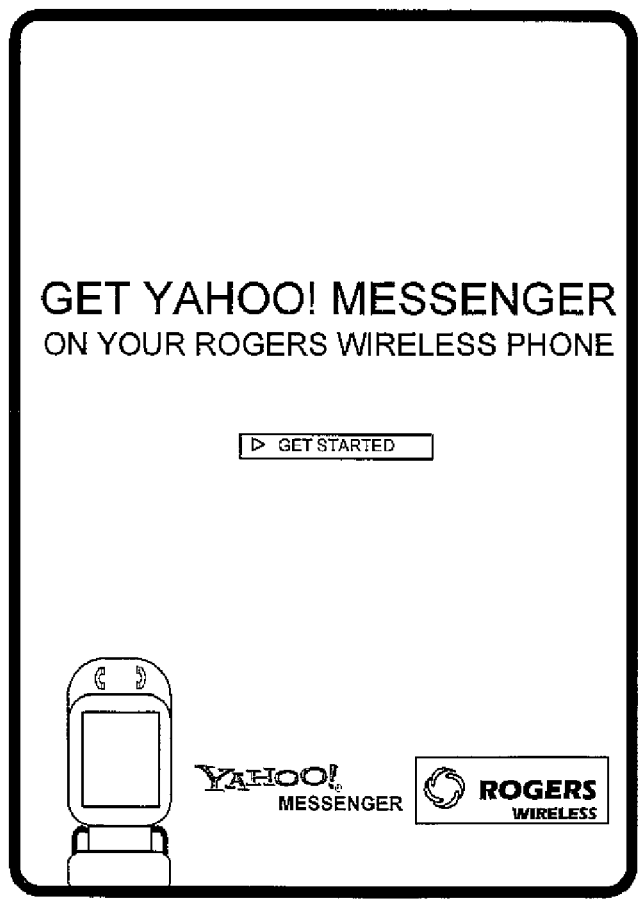
Figure 5C:

FIGS. 5a-c are examples of images which may be analyzed by the methods described herein, such as the embodiments described in FIGS. 1-3. FIGS. 5a-c are examples of images having similar content but different formats. These images are examples of images which may be found to be similar and/or near-duplicates according to some embodiments. The images may be merged into a single grouping or family according to some embodiments. These images are merely examples of images which may be analyzed by the methods described herein and claimed subject matter is not intended to be limited to any particular type of image, nor to these particular images.

While certain features of claimed subject matter have been illustrated as described herein, many modifications, substitutions, changes or equivalents will now occur to those skilled in the art. It is, therefore, to be understood that the appended claims are intended to cover all such embodiments or changes as fall within the true spirit of claimed subject matter.

What is claimed is:
1. A method comprising:
   determining similarity between or among at least two images comprising a query image and at least one other image, said similarity being based at least in part on:
     a first measurement of a similarity between a first correlogram of said query image and a second correlo- gram of said at least one other image meeting or exceeding a first threshold value, and a second measurement of similarity between a first histogram of said query image and a second histogram of said at least one other image meeting or exceeding a second threshold value, wherein said first histogram and said second histogram are determined at least partially in response to said first measurement of similarity meeting or exceeding said first threshold value.

2. The method of claim 1 wherein there is at least one correlogram and one histogram for each said at least two images.

3. The method of claim 1 further comprising:
selecting said query image.

4. The method of claim 1, further comprising identifying an image of said at least one other image having a smallest similarity or distance measure with respect to said query image.

5. The method of claim 1, wherein said second measurement of similarity is based at least in part on a distance measure between said first and second histograms.

6. The method of claim 1, wherein said first measurement of similarity is based at least in part on a distance measure between said first correlogram and said second correlogram.

7. The method of claim 1, wherein said first and second histograms and said first and second correlograms are determined based at least in part on pixel characteristics of said query image and said at least one other image, said pixel characteristics comprising color information and distance information for distances between pixels.

8. The method of claim 1, wherein at least one of said first correlogram and said second correlogram comprises a banded correlogram.

9. The method of claim 1, further comprising setting said first threshold value or said second threshold value.

10. The method of claim 1, further comprising determining said images are similar in response to said first and second threshold values being met.

11. The method of claim 1, further comprising determining said images are similar in response to said first and second threshold values being exceeded.

12. The method of claim 9, further comprising varying said first threshold value or said second threshold value to alter a similarity tolerance.

13. The method of claim 1, wherein said query image or said at least one other image comprise advertisements.

14. The method of claim 1 further comprising merging said query image and said at least one other image into an image family or grouping at least partially in response to determining said query image and said at least one other image to be similar.

15. The method of claim 14 further comprising assigning common metadata to images within said image family or grouping.

16. The method of claim 1 further comprising building said first correlogram by:
quantizing said query image into color values;
determining one or more distance values for distances between pixels within said query image;
analyzing said color values for said query image at said one or more distance values; and
determining a probability of an occurrence of a selected color at a selected distance value for said images based at least in part on said analyzing.

17. A method for determining image similarity comprising:

representing at least two images comprising advertisements, said at least two images comprising a query image and at least one other image;

creating a first correlogram for said query image and a second correlogram for said at least one other image based at least in part upon a comparison of pixel color and relative pixel distance information for said query image and said at least one or image, respectively;

determining a first similarity measurement between said first correlogram for said query image and said second correlogram for said at least one other image;

identifying one or more images of said at least one other image having said first similarity measurement meeting or exceeding a first threshold value;

creating a first histogram for said query image and at least a second histogram for said one or more identified images at least partially in response to said first similarity measurement meeting or exceeding said first threshold value;

determining a second similarity measurement between said first histogram for said query image and said at least a second histogram for said one or more identified images; and determining that said query image and said one or more identified images are similar at least partially in response to said second similarity measurement meeting or exceeding a second threshold value.

18. The method of claim 17 further comprising merging said similar images into an image grouping or family.

19. A method for determining image similarity comprising:

representing at least two images comprising advertisements, said at least two images comprising a query image and at least one other image;

creating a first histogram for said query image and a second histogram for said at least one other image based at least in part upon pixel color and relative pixel distance information for said query image and said at least one or image, respectively;

determining a first similarity measurement between said first histogram for said query image and said second histogram for said at least one other image;

selecting one or more images of said at least one other image having said first similarity measurement meeting or exceeding a first threshold value;

creating a first correlogram for said query image and at least a second correlogram for said one or more selected images at least partially in response to said first similarity measurement meeting or exceeding said first threshold value;

determining a second similarity measurement between said first correlogram for said query image and said at least a second correlogram for one or more identified images; and determining that said query image and said one or more selected images are similar at least partially in response to said second similarity measurement meeting or exceeding a second threshold value.

20. The method of claim 19 further comprising merging said similar images into an image grouping or family.

21. A non-transitory computer-readable medium containing instructions thereon, which are executable by one or more processors to:
  determining similarity between or among at least two images comprising a query image and at least one other image, said similarity being based at least in part on:
    a first measurement of a similarity between a first correlogram of said query image and a second correlogram of said at least one other image meeting or exceeding a first threshold value, and
    a second measurement of similarity between a first histogram of said query image and a second histogram of said at least one other image meeting or exceeding a second threshold value,
    wherein said first histogram and said second histogram are determined at least partially in response to said first measurement of similarity meeting or exceeding said first threshold value.

22. A system comprising:
  means for representing at least two images; and
  means for determining similarity between or among said at least two images comprising a query image and at least one other image, said similarity being based at least in part on:
    a first measurement of a similarity between a first correlogram of said query image and a second correlogram of said at least one other image meeting or exceeding a first threshold value, and
    a second measurement of similarity between a first histogram of said query image and a second histogram of said at least one other image meeting or exceeding a second threshold value,
  wherein said first histogram and said second histogram are determined at least partially in response to said first measurement of similarity meeting or exceeding said first threshold value.

* * * * *